United States Patent Office 2,897,206
Patented July 28, 1959

2,897,206

DIALKYLAMIDES OF α-(4-ANTIPYRYLAMINO)-FATTY ACIDS AND THEIR N-ALKYL DERIVATIVES

Tomijiro Fukui and Yoshiharu Matsuo, Kyoto, Japan, assignors to Nippon Shinyaku Co., Ltd., a company of Japan No Drawing. Application June 24, 1958
Serial No. 744,054

6 Claims. (Cl. 260—310)

The present invention relates to new chemical compounds, useful as antipyretics and analgesics, and more particularly to dialkylamides of α-(4-antipyrylamino)-fatty acids and their N-alkyl derivatives responding to the general formula:

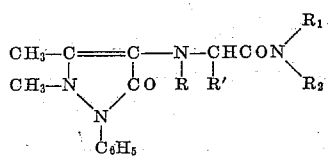

in which R is selected from the group consisting of hydrogen and a lower alkyl radical, R' is selected from the group consisting of hydrogen and a lower alkyl radical, $R_1$ is a lower alkyl radical, and $R_2$ is a lower alkyl radical.

Numerous pyrazolone derivatives having antipyretic and analgesic properties are known and have been synthesized. However, such compounds wherein side chain dialkylamino groups are directly attached to the carbonyl radical have not heretofore been described in the literature.

According to the present invention, a new series of compounds have been synthesized which exhibit strong antipyretic and analgesic activities characterized by good water solubility in contrast to the relatively insoluble compounds previously known.

For example, α-(4-antipyrylamino)-acetic dimethylamide (I) and α-(4-antipyryl-N-methylamino)-acetic dimethylamide (II) obtained by the present invention show excellent antipyretic and analgesic activities similar to 4-(α-dimethylaminopropionylamino)-antipyrine (III) (cf. Japanese Patent No. 215,097) and, furthermore, the water solubility of (I) and (II) is superior to the prior pyrazolone derivatives as shown in the following table. This is very important, especially in the preparation of injectable solutions.

| Substance | Amount Dissolved in 1 cc. of Water (at room temperature), g. |
|---|---|
| (I) | 1.5 |
| (II) | 0.68 |
| (III) | 0.18 |
| Aminopyrine | 0.056 |

The new compounds of the invention may, in general, be prepared by the condensation of the corresponding fatty acid with dialkylamine or its salts, or by the condensation of the corresponding α-halofatty acid dialkylamide with 4-amino- (or 4-alkylamino) antipyrine. N-alkyl derivatives of α-(4-antipyrylamino)-fatty acid dialkylamide may also be prepared by the alkylation of corresponding α-(4-antipyrylamino)-fatty acid dialkylamide using alkyl halide, dialkyl sulfate, or a mixture of formalin, formic acid and sodium formate (in the case of methylation).

The invention is illustrated by the following non-limitative examples:

EXAMPLE I

α-(4-antipyrylamino)-acetic dimethylamide (A) A mixture of 10 g. of ethyl α-(4-antipyrylamino)-acetate, 16 g. of a 40% aqueous solution of dimethylamine, and 0.8 g. of dimethylamine hydrochloride is heated in a sealed tube at 90–100° C. for 16 hours. The reaction solution is concentrated, dissolved in an aqueous solution of potassium carbonate, and extracted with chloroform. The extract is evaporated to the consistency of a syrup, treated with n-hexane, and then recrystallized from a mixture of ether and benzene. The yield is 6 g. M.P. 114–115° C. Analysis calculated for $C_{15}H_{20}O_2N_4$: C, 62.47%; H, 6.99%, N, 19.43%. Found: C, 62.66%; H, 6.98%; N, 19.30%.

(B) A mixture of 9.5 g. of α-(4-antipyrylamino)-acetic acid, 12 g. of dimethylamine and phosphorus pentoxide is treated as described in (A). The yield is 3.5 g.

(C) A mixture of 10 g. of α-(4-antipyrylamino)-acetic chloride, 18 g. of a 40% aqueous solution of dimethylamine and 1.5 g. of dimethylamine hydrochloride is treated as described in (A). The yield is 5.1 g.

Alternatively, α-(4-antipyrylamino)-acetic bromide can be used as the starting material to produce the same product by analogous reaction.

(D) A mixture of 10 g. of methyl α-(4-antipyrylamino)-acetate and 20 g. of a 10% methanolic solution of dimethylamine is heated in a sealed tube at 90–100° C. for 5 hours and treated as in (A) above. The yield is 8 g.

(E) A mixture of 29 g. of bromoacetic dimethylamide (prepared from bromoacetyl bromide and dimethylamine, B.P. 94–95° C.) and 60 g. of anhydrous potassium carbonate is added to a solution of 30 g. of 4-aminoantipyrine in 120 ml. of ethyl alcohol, and heated at 90–100° C. for 2 hours. After cooling, the mixture is filtered, and the mother liquor is condensed and then recrystallized from benzene to give 18 g. of the product. This was found to be identical to the compound obtained by method (A).

EXAMPLE II

α-(4-antipyrylamino)-acetic diethylamide

Ten g. of methyl α-(4-antipyrylamino)-acetate and 3.8 g. of diethylamine in 10 ml. of water are heated in a sealed tube at 90–100° C. for 16 hours, using diethylamine hydrochloride. After the reaction, the solution is condensed in vacuo, alkalinized with potassium carbonate, and extracted with chloroform. The extract is evaporated to a syrupy residue and dissolved in ethyl acetate and treated with oxalic acid to obtain the oxalate. M.P. 203° C. (decomposition).

EXAMPLE III

α-(-4-antipyrylamino)-propionic dimethylamide

A mixture of 18 g. of α-bromopropionic dimethylamide (prepared from bromopropionyl bromide and dimethylamine, B.P. 88° C.) and 60 g. of anhydrous potassium carbonate is added to a solution of 20 g. of 4-aminoantipyrine in 100 ml. of ethyl alcohol, heated at 90–100° C. for 4 hours, and then treated as in Example I (E). The yield is 24 g. M.P. 131–132° C. Analysis calculated for $C_{12}H_{28}O_3N_3$: C, 63.55%; H, 7.30%; N, 18.53%. Found: C, 63.54%; H, 7.60%; N, 18.65%.

EXAMPLE IV

α-(4-antipyryl-N-methylamino)-acetic dimethylamide (A) A mixture of 10 g. of methyl α-(4-antipyryl-N-methylamino)-acetate and 40 g. of a 36% benzene solution of dimethylamine is heated in a sealed tube at 160–170° C. for 8 hours. After evaporation of the benzene, the treatment is similar to Example I (A). After recrystallization from ether, the yield is 4.5 g. M.P. 119–120° C. Analysis calculated for $C_{16}H_{22}O_2N_4$: C, 63.55%; H, 7.33%; N, 18.53%. Found: C, 63.58%; H, 7.42%; N, 18.70%.

(B) A mixture of 10 g. of α-(4-antipyrylamino)-acetic dimethylamide (obtained according to Example I), 5.6 g. of 35% formalin, 3 g. of 80% formic acid, and 2.4 g. of sodium formate is heated at 90–100° C. for 1 hour, alkalinized and extracted with benzene. The extract is dried, evaporated, and the residue recrystallized from benzene to yield 9.9 g. of the product. This was found to be identical with the compound obtained from method (A) above.

(C) Five g. of α-(4-antipyrylamino)-acetic dimethylamide in chloroform is boiled with 2.7 g. of dimethyl sulfate and 1.3 g. of quick lime for 4 hours. The chloroform layer is washed with alkali solution, evaporated, and the residue recrystallized from benzene, yielding 3.2 g. of the product. This was found to be identical with the compound obtained from method (A) of this example.

The reaction also takes place with methyl bromide and dimethyl sulfate, producing the same product in good yield.

(D) A mixture of 16 g. of chloroacetic dimethylamide (prepared from chloroacetyl chloride and dimethylamine, B.P. 98–99° C.) and 40 g. of potassium carbonate is added to a solution of 20 g. of 4-methylaminoantipyrine in 100 ml. of ethyl alcohol, heated at 90–100° C. for 2 hours, and then treated as in Example I (E), yielding 20 g. of the product. This was found to be identical with the compound obtained from method (A) of this example.

EXAMPLE V

α-(4-antipyryl-N-methylamino)-propionic dimethylamide (A) A mixture of 16 g. of α-bromopropionic dimethylamide and 40 g. of potassium carbonate is added to a solution of 20 g. of 4-methylaminoantipyrine in 100 ml. of ethyl alcohol, heated at 90–100° C. for 2 hours, and then treated as in Example I (E), yielding 20 g. of the product. M.P. 100–102° C. Analysis calculated for $C_{17}H_{24}O_2N_4$: C, 64.53%; H, 7.65%; N, 17.71%. Found: C, 64.65%; H, 7.60%; N, 17.58%.

(B) A mixture of 5 g. of α-(4-antipyrylamino)-propionic dimethylamide (obtained according to Example III), 2.6 g. of methyl iodide, and 10 ml. of methyl alcohol is heated in a sealed tube at 80–100° C. for 4 hours. After the reaction, the solvent is evaporated, the residue extracted with chloroform, washed with alkali solution and evaporated, and the residue recrystallized from benzene, yielding 3 g. of the product. This was found to be identical with the compound obtained from method (A) above.

What is claimed is:

1. A compound of the general formula:

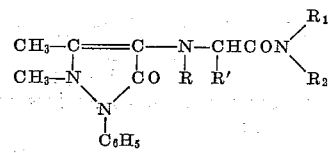

in which R is selected from the group consisting of hydrogen and a lower alkyl radical, R' is selected from the group consisting of hydrogen and a lower alkyl radical, $R_1$ is a lower alkyl radical, and $R_2$ is a lower alkyl radical.

2. The compound α-(4-antipyrylamino)-acetic dimethylamide.

3. The compound α-(4-antipyrylamino)-acetic diethylamide.

4. The compound α-(4-antipyrylamino)-propionic dimethylamide.

5. The compound α-(4-antipyryl-N-methylamino)-acetic dimethylamide.

6. The compound α-(4-antipyryl-N-methylamino)-propionic dimethylamide.

No references cited.